United States Patent [19]

Blechman

[11] 3,752,113

[45] Aug. 14, 1973

[54] CASSETTE TAPE MOVEMENT INDICATOR

[76] Inventor: Frederick Blechman, 23958 Archwood St., Canoga Park, Calif.

[22] Filed: Aug. 2, 1971

[21] Appl. No.: 168,081

[52] U.S. Cl. .......... 116/114 R, 242/74, 242/118.61, 274/4 C, 274/11 C

[51] Int. Cl. .......... G01d 21/00

[58] Field of Search .......... 116/114, 67 A, 67; 74/89, 96; 274/4 C, 4 D; 242/118.8, 118.64, 118.61, 116, 118.4, 74; 352/170, 171, 172; 113/116 D; 33/128; 40/2 R

[56] References Cited

UNITED STATES PATENTS

| | | | |
|---|---|---|---|
| 1,429,692 | 9/1922 | Passavanti | 242/74 |
| 1,919,270 | 7/1933 | Bird | 242/118.61 |
| 2,139,557 | 12/1938 | Moretti | 242/118.61 |
| 2,330,909 | 10/1943 | Olson | 33/128 |
| 2,802,290 | 8/1957 | Carey | 40/2 R |
| 2,940,417 | 6/1960 | Starck | 116/67 A |
| 3,126,641 | 3/1964 | Hawn | 33/128 X |
| 3,638,955 | 2/1972 | Wada | 116/114 |

FOREIGN PATENTS OR APPLICATIONS

| | | | |
|---|---|---|---|
| 1,498,288 | 9/1967 | France | 274/4 C |
| 297,073 | 5/1954 | Switzerland | 274/4 C |

*Primary Examiner*—Louis J. Capozi
*Attorney*—John G. Mesaros

[57] ABSTRACT

A cassette tape movement indicator having indicating means coupled to the takeup hub of the tape cassette, the indicating means being viewable through the window of a cassette recorder. In one embodiment the indicating means is a removable insert having a plurality of radially extending tines from a central portion having downwardly depending projections adapted for engagement with the inwardly extending projections on the hub of the cassette. In a second embodiment a transparent disc is coupled to the hub internally of the cassette, the disc having markings thereon viewable through the window in the cassette, one disc being associated with each hub of the cassette, the discs being positioned on that side of the hub which is viewable through the window of the cassette when that particular hub has tape being wound thereon.

12 Claims, 6 Drawing Figures

FREDERICK BLECHMAN
INVENTOR

BY John D. Mesaros

ATTORNEY

CASSETTE TAPE MOVEMENT INDICATOR

BACKGROUND OF THE INVENTION

This invention relates to a cassette tape movement indicator and more particularly to a cassette tape movement indicator coacting with the takeup hub of the cassette, the indicator being viewable through the window of a cassette recorder.

Cassette recorders have achieved a great degree of popularity both as a recording device and a playback device. In the recording mode, however, problems are encountered when one is recording due to the inability to readily visually discern movement of the tape within the cassette. The readily available commercial cassettes are provided with a viewing window on either side thereof, the window usually being approximately ¾ by ⅛ inch. Through this window one can see the magnetic recording tape which is wound about a pair of hubs spaced approximately 1⅝ inches apart. The tape ends are permanently fastened to each hub. When the cassette is inserted within a recorder the hubs and the tape are generally viewable through a plastic or glass window on the recorder itself. The purpose of the window is to allow the user to determine the approximate amount of tape remaining on the supply hub. A rough scale is printed on the cassette to estimate tape accumulation on the takeup hub. When one is recording it becomes very difficult to ascertain whether or not the takeup hub is still moving and therefore much information may be lost before the user is aware that there is no rotation of the hub, and hence no movement of the recording tape. Also, due to the close clearances within the cassette, tape "jamming" is a common problem not easily discernible. Additionally, due to the plastic or glass window in the recorder, the reflection makes it difficult to determine whether the tape or the hub is moving. Hence, the supply reel could be empty of recording tape without the user being aware. Furthermore, since the tape cassette is recessed from the glass window and the opening in the cassette is of such small dimensions, it is virtually impossible at any angle of viewing other than practically overhead, to see either the tape or the hubs.

SUMMARY OF THE INVENTION

In accordance with my invention, I provide an indicator element which may be mounted to the hub of the cassette externally of the cassette by suitable projections on the indicator. The indicator may include radially extending tines, or may be of a disc construction with irregular perimeter or radially extending markings or a color pattern thereon. In a second embodiment the indicator element may be mounted to the hub internally of the cassette, the indicator being transparent with radially extending markings so that the markings passing the window of the cassette give an indication of movement, yet still allow a view of the tape accumulating on the takeup hub. In this embodiment two discs are provided, one on each hub on alternate sides thereof so that the takeup hub in either position is an indicator element.

Accordingly, it is an object of this invention to provide a new and improved tape movement indicator.

It is another object of this invention to provide a new and improved tape movement indicator for use with a tape cassette.

It is a further object of this invention to provide a new and improved cassette tape movement indicator to provide ready visual indication of tape movement.

It is still another object of this invention to provide a new and improved cassette tape movement indicator in the form of an insert.

It is a still further object of this invention to provide a new and improved cassette tape movement indicator for determining movement by casual observation.

DESCRIPTION OF THE DRAWINGS

Other objects and advantages of the present invention will become apparent from the following detailed description when considered with the accompanying drawings in which.

DESCRIPTION OF THE PREFERRED EMBODIMENTS

Figure 1:
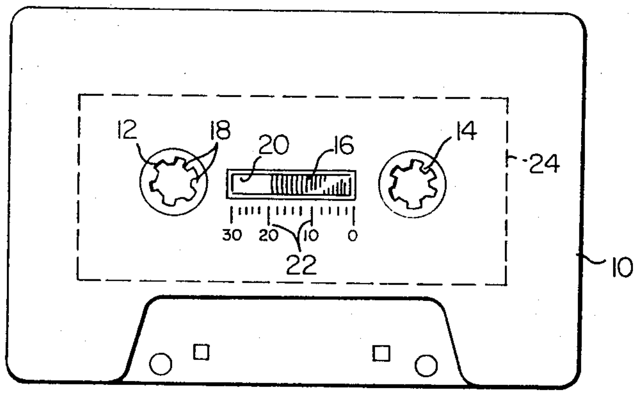
FIG. 1 is a top view of a standard magnetic tape cassette.

Referring now to the drawing and particularly to FIG. 1 there is shown a standard magnetic recording tape cassette 10 having a pair of hubs 12 and 14 having wound thereon recording tape 16. Such magnetic tape cassettes 10 have achieved popularity in part due to the compactness thereof, which compactness is possible because the magnetic recording tape 16 winds between supply hub 12 and takeup hub 14 within the parallel sidewalls of the cassette 10. Hence reels are not necessary in the cassette thereby permitting virtually the full amount of space between hubs 12 and 14 to be taken up by recording tape 16. With the conventional reel to reel tape recorders, the spacing between the axis of the reels must be more than twice the radius of the reels although only less than half the spacing is occupied by magnetic recording tape.

In the magnetic tape cassette 10, when recording, the inwardly radially extending projections 18 of hubs 12 and 14 engage a pair of shafts on the cassette recorder with only one of these shafts being driven. These shafts each have three outwardly extending projections to engage the cassette hubs 12 and 14. When recording, one shaft will drive hub 14 counterclockwise (as viewed in FIG. 1) to wind the tape 16 thereon. The magnetic tape 16 is viewable through a window 20 of the cassette 10 between hubs 12 and 14 so that one may be able to discern the amount of magnetic recording tape 16 that has wound on the takeup hub 14, and the amount of tape remaining on the supply hub 12. Also, adjacent to the window 20 there are scribe marks 22 which give a rough estimation of the time used or the percentage of tape 16 used. The aperture 20 is approximately ¾ inch long by ⅛ inch wide. With the cassette 10 in a tape recorder, the hubs 12 and 14 and the aperture 20 are viewable through a window 24 (shown in dotted lines)

in the tape cassette cavity of the recorder. This window 24, however, is generally made of glass or other rigid plastic of a transparent nature which presents problems when attempting to view the movement of the hubs 12 and 14 or the tape 16 itself. The window 24 may be for example 2¾ inch by 1¼ inch. However, the spacing between the window 24 and the upper surface of the cassette 10 is approximately ⅜ inch or greater, thereby rendering visual observation of the movement of the small diameter hubs 12 and 14 extremely difficult in all but directly overhead iewing positions. Consequently when one is recording on the magnetic tape 16 of the cassette 10, it cannot be readily discerned that the hubs 12 and 14 are not moving and the operator continues to record without realizing this, thereby losing information desired to be recorded. This occurs frequently since tape jamming is very common. Also, when the tape 16 reaches its end, the hubs 12 and 14 stop moving, so no movement is an indication of either jamming or reaching the end of the tape 16, both of importance to the user.

Figure 3:
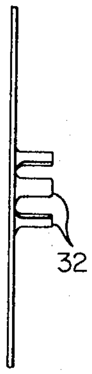
FIG. 3 is a side view of a tape movement indicator of FIG. 2.
Figure 2:
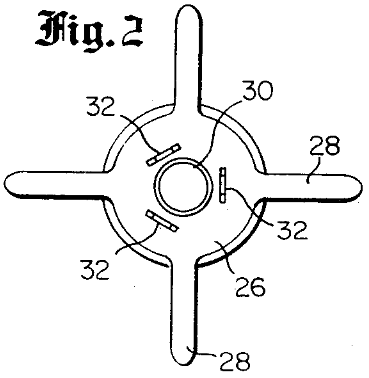
FIG. 2 is a top plan view of a tape movement indicator according to the invention.
Figure 4:
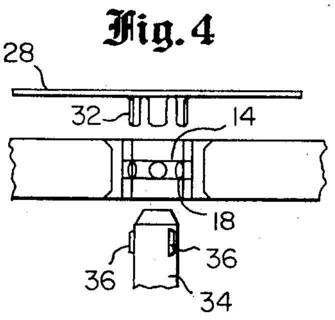
FIG. 4 is a side view partially broken away of a tape cassette showing the relation of the tape movement indicator of FIG. 2 therewith.

In accordance with this invention an indicator element is provided for cooperative engagement with either the supply hub 12 or the takeup hub 14 (when the cassette 10 is turned over to record on the other track of the magnetic tape 16, the hub 12 will be the takeup hub and hub 14 will be the supply hub). In one embodiment the indicator element as shown in FIGS. 2, 3 and 4 consists of a main, generally circular body portion 26 having integral therewith and radially extending therefrom a plurality of tines 28, the body portion 26 having located therein a central aperture 30. Extending downwardly from the body portion 26 are three projections 32, the spacing thereof being such as to matingly engage the takeup hub 14 in the alternate spaces intermediate the projections 18. As it can be seen in FIG. 4, the projections 18 (usually six projections) of takeup hub 14 are adapted to engage a drive shaft 34 of a tape recorder, the drive shaft 34 commonly having three stub projections 36 equi-angularly disposed about the periphery thereof. The projections 34 of the indicator element do not interfere with the rotation of shaft 34 within hub 14 since the projections 32 frictionally engage the hub 14 in the spaces intermediate the hub projections 18 not occupied by the shaft projections 34. The radially extending tines 28 are of a length sufficient to be readily discernible in the window 24 of the tape recorder so that rotation of the indicating element is readily discernible. The projections 32 can also be suitably configured or slanted for frictional engagement with hub 14. While there have been shown three projections 32 of the indicator insert, it is to be understood that any number can be used, the only criteria being that the projections 32 fit within the space between radially inwardly extending projections 18 of the takeup hub 14. Furthermore, while four tines 28 have been shown, it is to be understood that any other number thereof can be utilized or the insert may have a different configuration, may be square, triangular or irregularly shaped, or may even be colored with desired patterns to assist in visually discerning the rotation thereof. However, one of the primary criteria is that the amount of recording tape 16 viewable within aperture 20 should not be totally obscured so that the operator has the opportunity to closely observe the cassette 10 to determine how much recording time is left.

Figure 5:
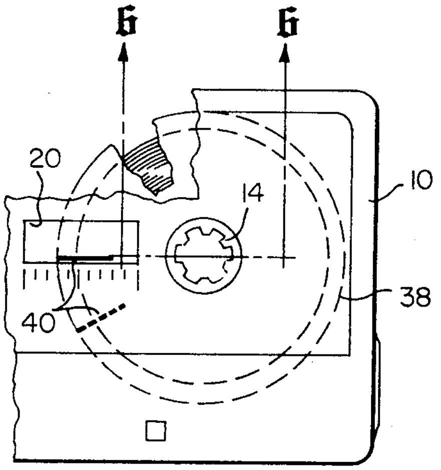
FIG. 5 is a plan view partially broken away of a tape cassette having an alternate embodiment of tape movement indicator.
Figure 6:
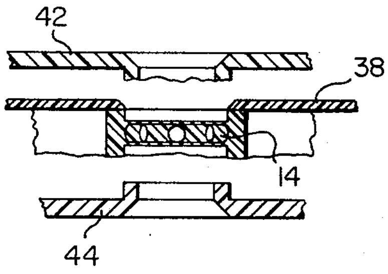
FIG. 6 is a cross-sectional view taken along lines 6—6 of FIG. 5.

In the alternate embodiment of FIGS. 5 and 6, the indicator element may take the form of a transparent disc 38 secured within the housing of the tape cassette 10 for rotation with takeup hub 14. The radius of the generally transparent disc 30 is such that it is viewable through the aperture 20 of the tape cassette 10. The disc 38 has radially extending marks 40 imprinted on the surface thereof adjacent the outer periphery thereof so that the marks 40 are readily observable as they move past aperture 20 when the hub 14 is rotating. As shown in FIG. 6, during the assembly of the tape cassette 10, the disc 38 can be secured to hub 14 prior to assembly of the upper and lower housing members 42 and 44 respectively of the tape cassette 10. Only one disc 38 is associated with a given hub, the discs 38 being disposed one above takeup hub 14 and the other below supply hub 12 so that when hub 12 becomes the takeup hub by turning the cassette over, the disc 38 associated therewith is in the viewing position. It is to be understood that the marks 40 can be replaced by other indicia or patterns observable through aperture 20, or the disc 38 may have other configurations. The disc 38 or other member having a different configuration should have at least portions thereof extending beyond the full diameter of magnetic tape to be wound thereon, and secondly the disc 38 or other member must not totally obscure from the operator the amount of tape contained thereunder.

While there have been shown and described preferred embodiments, it is to be understood that various other modifications and other adaptations may be made within the spirit and scope of the invention.

What is claimed is:

1. A tape movement indicator for use with a tape cassette having the tape wound between hubs within a housing having a viewing aperture between the hubs to display the disposition of tape therein, said indicator comprising:

a body portion;

means on said body portion for engaging one of the hubs for rotation therewith;

indicating meanS on said body portion extending into proximity with but displaced from the viewing aperture, said indicating means being disposed on said body portion to permit generally unobstructed viewing of the disposition of the tape within the aperture.

2. The combination according to claim 1 wherein said body portion is a disc.

3. The combination according to claim 1 wherein the engaging means includes a plurality of depending projections for matingly engaging a hub externally of the housing.

4. The combination according to claim 3 wherein the indicating means are radially extending portions.

5. The combination according to claim 3 wherein the indicating means are radially extending tines.

6. The combination according to claim 3 wherein the projections frictionally engage the hub intermediate inwardly radially extending hub projections.

7. The combination according to claim 2 wherein the disc is secured to the hub within the housing and the indicating means thereon extend substantially the length of the viewing aperture.

8. The combination according to claim 7 wherein the body portion is a transparent disc and the indicating means are radially disposed markings thereon.

9. The combination according to claim 8 wherein the markings are colored lines.

10. In a magnetic recording tape cassette the combination comprising:

a housing having a generally parallel upper and lower walls therein;

a first and second pair of aligned apertures in the walls in an axial direction perpendicular to the plane of the walls;

a first and a second hub members axially aligned with each pair of apertures for rotational movement with respect to the housing;

a length of magentic recording tape having one end thereof secured to said first hub and the other end thereof secured to said second hub for winding therebetween;

a pair of aligned generally rectangular viewing apertures in said walls between said hubs for viewing the tape therein;

a first and a second indicator members, each of said indicator members having at least portions thereof having a radius greater than the radius of all the tape wound on one of said hubs, one of said indicator members being secured to each of said hubs adjacent opposite walls of said housing, each of said members having said portions thereof viewable through its respective viewing aperture when said hubs are rotating, said indicator members being so configured to permit generally unobstructed viewing of the disposition of the tape within said aperture.

11. The combination according to claim 10 wherein said indicator member is a transparent disc with markings thereon viewable through the aperture.

12. The combination according to claim 11 wherein the markings are radially extending colored lines.

* * * * *